US012633085B2

(12) United States Patent
Hack et al.

(10) Patent No.: US 12,633,085 B2
(45) Date of Patent: May 19, 2026

(54) METHOD FOR DETERMINING THE STORAGE FUNCTIONALITY OF AN IMAGING PLATE FOR X-RAY IMAGES

(71) Applicant: DÜRR DENTAL SE, Bietigheim-Bissingen (DE)

(72) Inventors: Alexander Hack, Biberach (DE); Alexander Ladikos, Dachau (DE); Simon Jagoda, Munich (DE); Matthias Wieczorek, Munich (DE)

(73) Assignee: DÜRR DENTAL SE, Bietigheim-Bissingen (DE)

( * ) Notice: Subject to any disclaimer, the term of this patent is extended or adjusted under 35 U.S.C. 154(b) by 497 days.

(21) Appl. No.: 18/042,602

(22) PCT Filed: Aug. 9, 2021

(86) PCT No.: PCT/DE2021/100678
§ 371 (c)(1),
(2) Date: Feb. 23, 2023

(87) PCT Pub. No.: WO2022/042794
PCT Pub. Date: Mar. 3, 2022

(65) Prior Publication Data
US 2024/0029270 A1     Jan. 25, 2024

(30) Foreign Application Priority Data
Aug. 25, 2020     (DE) ..................... 10 2020 122 196.7

(51) Int. Cl.
*G06V 10/75*      (2022.01)
*G06T 7/13*       (2017.01)
*G06T 7/30*       (2017.01)

(52) U.S. Cl.
CPC .............. *G06V 10/758* (2022.01); *G06T 7/13* (2017.01); *G06T 7/30* (2017.01); *G06T 2207/10116* (2013.01); *G06T 2207/30204* (2013.01)

(58) Field of Classification Search
CPC ........ G06V 10/758; G06V 10/16; G06T 7/30; G06T 7/001; G06T 5/50; G06T 7/0014;
(Continued)

(56) References Cited

U.S. PATENT DOCUMENTS

| 8,939,583 B2 * | 1/2015 | Borycki | ................. | G06T 7/337 |
| | | | | 351/208 |
| 2015/0092997 A1 * | 4/2015 | Yamaguchi | ............ | G06V 20/30 |
| | | | | 382/118 |

(Continued)

FOREIGN PATENT DOCUMENTS

| DE | 102017121338 A1 | 3/2019 |
| JP | 4101489 B2 * | 6/2008 |
| WO | 2019/053171 A1 | 3/2019 |

OTHER PUBLICATIONS

Normalized Cross Correlation—an Overview | Sciencedirect Topics, www.sciencedirect.com/topics/computer-science/normalized-cross-correlation. Accessed Oct. 27, 2025. (Year: 2025).*

(Continued)

*Primary Examiner* — Sumati Lefkowitz
*Assistant Examiner* — Connor L Hansen
(74) *Attorney, Agent, or Firm* — Chiesa Shahinian & Giantomasi PC

(57)     ABSTRACT

This invention is related to a method for determining the storage quality of an X-ray imaging plate, including the steps of: providing a plurality of digital X-ray images of the imaging plate; performing a cross-correlation operation on the X-ray images for relevant image regions; creating feature images from the correlation values; classifying the (Continued)

functionality of a pixel of a feature image based on the number of pixels in the vicinity of the pixel whose correlation value exceeds a correlation threshold.

Further, the invention also relates to an apparatus.

14 Claims, 5 Drawing Sheets

(58) Field of Classification Search
CPC . G06T 7/11; G06T 7/174; G06T 2207/10116; G06T 2207/30204; G01N 23/18; G01N 2223/645
See application file for complete search history.

(56) References Cited

U.S. PATENT DOCUMENTS

| | | | |
|---|---|---|---|
| 2019/0011183 A1* | 1/2019 | Baumert | C21C 5/565 |
| 2020/0278459 A1 | 9/2020 | Schramm et al. | |

OTHER PUBLICATIONS

Sharma, Vipin. "Image-Template Matching Using Cross-Correlation." Medium, MLearning.ai, Feb. 21, 2022, vipin-sharma. medium.com/image-template-matching-using-cross-correlation-2f2b8e59f254. (Year: 2022).*

Kalathingal, Sajitha Menon, et al. "Rating the extent of surface scratches on photostimulable storage phosphor plates in a dental school environment." Dentomaxillofacial Radiology 39.3 (2010): 179-183. (Year: 2010).*

Soredex, "DIGORA Optime—User Manual", Dexis, Jan. 2017, https://elabeling.dexis.com/en/downloads-center?combine=optime &field_resource_language_tid%5B%5D=2104&field_resource_language_tid%5B%5D=2105&field_resource_product_tid=All&field_resource_part_number_tid=All (Year: 2017).*

International Search Report and Written Opinion mailed Nov. 18, 2021, in connection with International Patent Application No. PCT/DE2021/100678, 11 pgs. (including translation).

Bermudez et al., "A First Glance to the Quality Assessment of Dental Photostimulable Phosphor Plates with Deep Learning," 2020, 2020 International Joint Conference on Neural Networks (IJCNN), pp. 1-6.

* cited by examiner

Exposing an imaging plate with an
x-ray exposure device

~ S21

Reading the imaging plate with a
scanning device

~ S22

Reading an imaging plate ID from an
RFID tag attached to the imaging plate

~ S23

Storing the read digital x-ray image
together with the imaging plate ID at a
storage location

~ S24

METHOD FOR DETERMINING THE STORAGE FUNCTIONALITY OF AN IMAGING PLATE FOR X-RAY IMAGES

CROSS-REFERENCE TO RELATED APPLICATIONS

This application is a National Stage under 35 U.S.C. 371 of International Patent Application No. PCT/DE2021/100678, filed Aug. 9, 2021, which claims priority to German Patent Application No. 102020122196.7, filed Aug. 25, 2020; the disclosures of all of which are incorporated herein by reference in their entirety.

FIELD

The invention concerns a method for determination of the storage functionality of an imaging plate for X-ray images.

BACKGROUND

In X-ray technology, especially in dental X-ray technology, imaging plates are nowadays widely used to record X-ray images. These imaging plates comprise a phosphor material embedded in a transparent matrix. This creates storage centers that are brought into excited metastable states by incident X-ray light. If such an imaging plate is exposed by means of an X-ray device, the imaging plate contains a latent image in the form of excited and unexcited storage centers.

To read out the imaging plate, it is scanned point-by-point with readout light in a scanning device, causing the metastable states of the excited storage centers to relax, emitting fluorescence light. This fluorescence light can be detected with the aid of a detector unit, so that a digital X-ray image is obtained with appropriate evaluation electronics. Drum or flatbed scanners, for example, are used for the readout process.

A major advantage of imaging plate technology is that the imaging plates can be reused. After the imaging plate has been read out, during which the image information stored in the plate is erased anyway, it can be used for further imaging and storage processes. Various aging processes impose limits on reusability. On the one hand, local storage centers can form over time that can no longer be stimulated and thus remain dark in the X-ray image. On the other hand, mechanical stresses on the surface of the imaging plate can leave scratches or punctiform damage in practical operation.

It is therefore desirable to be able to assess the storage functionality of an imaging plate. For example, the imaging plate can be inspected and the surface examined for scratches or other damage and classified accordingly. Furthermore, the number of images taken with the imaging plate or the number of readouts can be counted. As a further factor, the service life of the imaging plate can be taken into account on the basis of a production date. However, these measures do not provide any reliable information about the actual storage functionality of the imaging plate.

SUMMARY OF THE INVENTION

It is an object of the invention to provide a method for determination of the storage functionality of an X-ray imaging plate which avoids the above-mentioned disadvantages and, in particular, makes it possible to make an accurate statement about the storage functionality and quality of the imaging plate.

The object is solved by a method for determination of the storage functionality of an X-ray plate according to the independent claim. The method according to the invention has the steps:

Providing a plurality of digital X-ray images of the imaging plate; performing a cross-correlation operation on the X-ray images for relevant image regions; creating feature images from the correlation values; classifying the storage functionality of a pixel of a feature image based on the correlation values of other pixels in the vicinity of the pixel.

The inventors have recognized that for the determination of the storage functionality and quality of an imaging plate, an analysis of X-ray images created with the same imaging plate provides a good basis. Defects on the imaging plate that may be responsible for degradation of storage functionality are stationary. For a detection of such stationary structures, a pure pixel-based comparison of the individual X-ray images is usually not successful. Even when reading out the same imaging plate with the same readout device, X-ray images can be generated that differ at the pixel level, for example due to different curvatures of the imaging plate during the readout process. In addition, the different X-ray images—for example X-ray images of molars—may have similar structures in certain areas in a 1-to-1 comparison on the pixel plane. This would lead to false-positive results, i.e. a pixel is recognized as unchangeable and thus no longer usable, although this conclusion is based on the fact that a structure is actually always imaged at this pixel.

In order to nevertheless determine the storage functionality of an X-ray imaging plate, according to the invention a cross-correlation operation is carried out between the various existing digital X-ray images. In this case, it is advantageous if the correlation operation is performed only on relevant image regions and non-relevant image regions, such as markings of the imaging plate for alignment or/and the imaging plate edge possibly also imaged in the X-ray image, are excluded from the operation.

The cross-correlation operation provides correlation values, which in turn can be combined to form an image. The image consisting of correlation values is called a feature image, since it reveals features of the underlying imaging plate on the basis of the correlation operation. In this way, especially those features are displayed that have the same or very similar characteristics on both X-ray images and are thus presumably features of the imaging plate and not imaged structures.

A pixel of such a feature image can now be classified with respect to its storage functionality or capability. For this purpose, the correlation values of those pixels are considered which are located in its vicinity. Based on the level of correlation of the surrounding pixels, it can be determined whether the pixel under consideration is highly correlated. If this is the case, its storage functionality is classified as faulty.

In a preferred embodiment of the method, only pixels in the vicinity whose correlation value exceeds a correlation threshold are used in the classification step. Thus, a correlation threshold is defined with which the pixels in the vicinity are compared. Preferably, only those pixels are then used for classification whose correlation value increases this correlation threshold.

Alternatively, or additionally, a mean correlation value can be calculated for the pixels in the vicinity. This mean correlation value can also be compared to a correlation threshold.

Preferably, the cross-correlation operation is performed in pairs between an X-ray image and the other provided X-ray images of the same imaging plate. Thus, on a number n of provided X-ray images, the cross-correlation operation can be performed ½ n (n–1) times. This results in ½ n (n–1) feature images. Preferably, this cross-correlation operation takes place on at least 10, preferably on at least 20, particularly preferably on at least 30 X-ray images.

In the cross-correlation operation, the calculation of the correlation can be performed, for example, on a small section of the entire image. This section, referred to here as the correlation field, is selected to be small enough to allow reliable detection of typical damage such as scratches. With a typical ratio of 25 s/storage center or per pixel, a side length of 400 μm or 16 pixels is advantageous.

Preferably, this correlation field is shifted pixel by pixel for the calculation of the cross-correlation and a correlation calculation is performed each time.

To improve the process, preferably an alignment detection or/and an edge detection can be performed on the digital X-ray images before performing the cross-correlation operation. In this way, the contrast of the feature images is improved.

Particularly preferably, the digital X-ray images have usage data. It is therefore not necessary to perform blank exposures or the like to determine the storage functionality of an X-ray storage film. Rather, the storage functionality of the digital X-ray images recorded on the same imaging plate can be monitored and analyzed in the background, so to speak, during operation. It is therefore neither necessary to use specific exposure parameters nor to record special X-ray images intended for the purpose of determining the storage functionality with the imaging plate. Only the entire X-ray image pool generated with the same imaging plate or parts thereof, for example the last 30 exposures or the exposures of the last X days, must be made available for analysis.

Specifically, preferably the cross-correlation operation is a locally normalized calculation, for example using the Locally Normalized Cross Correlation (LNCC) algorithm.

Preferably, the vicinity of the pixel considered for classification is a square with a side length between 10 μm and 1000 μm, preferably between 200 μm and 500 μm, particularly preferably of 400 μm.

In a further development of the method, the storage functionality of the pixel is classified as faulty if the number of pixels in the vicinity whose correlation value exceeds a correlation threshold is greater than or equal to a maximum number. Preferably, this maximum number is 25% of all pixels in the analysis field. Thus, if for 25% of all pixels in the vicinity of the pixel under consideration the correlation value is above a correlation threshold, the storage functionality of this pixel is classified as faulty.

The relevant image regions on which the cross-correlation operation is performed exclude markings of the imaging plate such as alignment marks or/and the edge of the imaging plate that may be visible on the X-ray image.

Additionally, when classifying the storage capability of a pixel, the acquisition date of an X-ray image can be taken into account in the classification step.

The object is further solved by a device for determining the storage capability of an imaging plate for X-ray images. The device according to the invention has an imaging plate readout apparatus for reading out an exposed imaging plate, and a control device configured to perform a method as described above.

BRIEF DESCRIPTION OF THE DRAWINGS

In the following, embodiments of the invention are explained in more detail with reference to the drawings.

DETAILED DESCRIPTION

Figure 1:
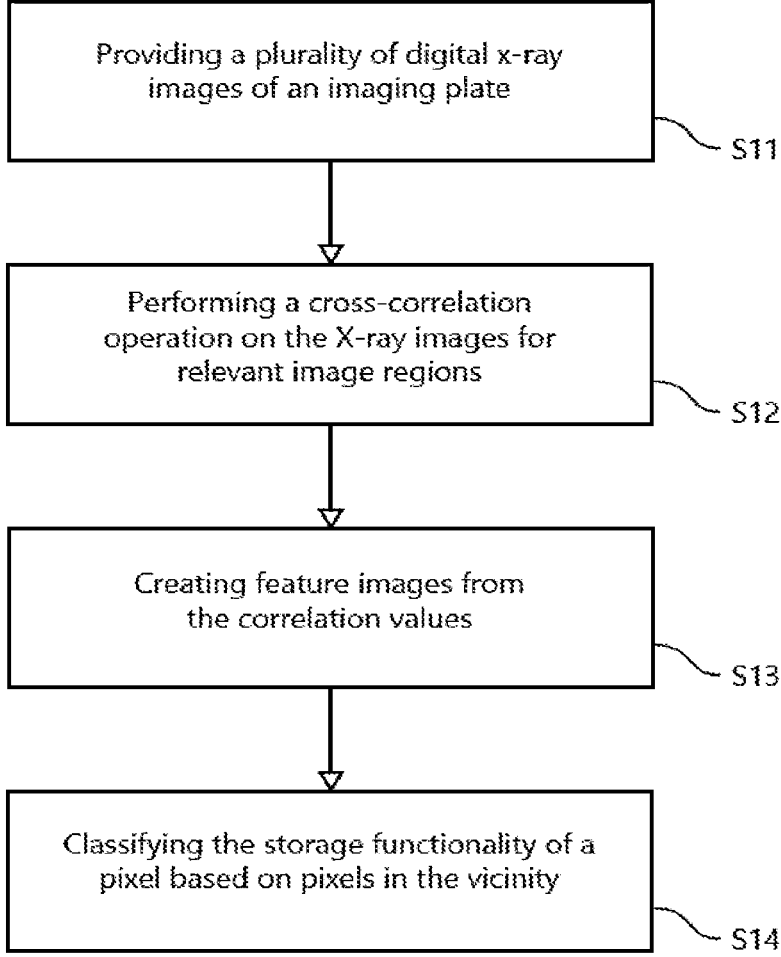
FIG. 1 shows a first embodiment.

FIG. 1 illustrates the method according to the invention in a first embodiment.

In a first step (S11), a plurality of digital X-ray images of an imaging plate are provided. The X-ray images originate from the same imaging plate. By this is meant that each of the X-ray images originates from the physically identical imaging plate. In this way, it is possible to detect the possible presence of defects on or in the imaging plate. The plurality of X-ray images can be, for example, the last 10, 20 or 30 images with actual usage data. However, in principle, any subset can be formed from the available X-ray images. For example, the usage data may come from using the imaging plate for normal diagnostic purposes. The providing step may comprise, for example, using a unique identifier assigned to the imaging plate to filter out the X-ray images belonging to that imaging plate from a larger number of X-ray images. For example, the imaging plate may have an RFID tag on which a unique identification number is stored. When the imaging plate is read out by means of the imaging plate readout apparatus, this identification number can be queried and added to the X-ray image—for example in the metadata—and stored with it.

Additionally, or alternatively, the step of providing can comprise filtering according to the recording date of the X-ray images of the same imaging plate.

In a further step (S12), a cross-correlation algorithm is applied to the provided X-ray images for relevant image regions. The relevant image regions may have already been selected from the provided X-ray images before applying the cross-correlation algorithm. When applying the cross-correlation algorithm, X-ray images in pairs are checked with regard to their correlation.

With the correlation values obtained from the cross-correlation algorithm, a feature image is created in a further step (S13). In this feature image, features are recognizable which do not originate from the usage data, but which reflect the storage functionality of the imaging plate.

In order to characterize a pixel or entire image regions with respect to their storage functionality, the vicinity of a pixel of the X-ray image is considered in a further step (S14). Based on the correlation values of the pixels surrounding the examined pixel, the storage functionality of the examined pixel can be inferred and its storage functionality can be characterized or classified. If, for example, the individual or all correlation values exceed a certain threshold, the storage functionality of the pixel under investigation can be classified as "non-existent" or "faulty" accordingly. Alternatively, or additionally, a number of pixels that meet or exceed the correlation threshold may be considered. For example, if a certain percentage of the surrounding pixels exceeds a certain threshold, the storage functionality of the pixel under examination may be flagged as "not present" or "faulty".

Figure 2:
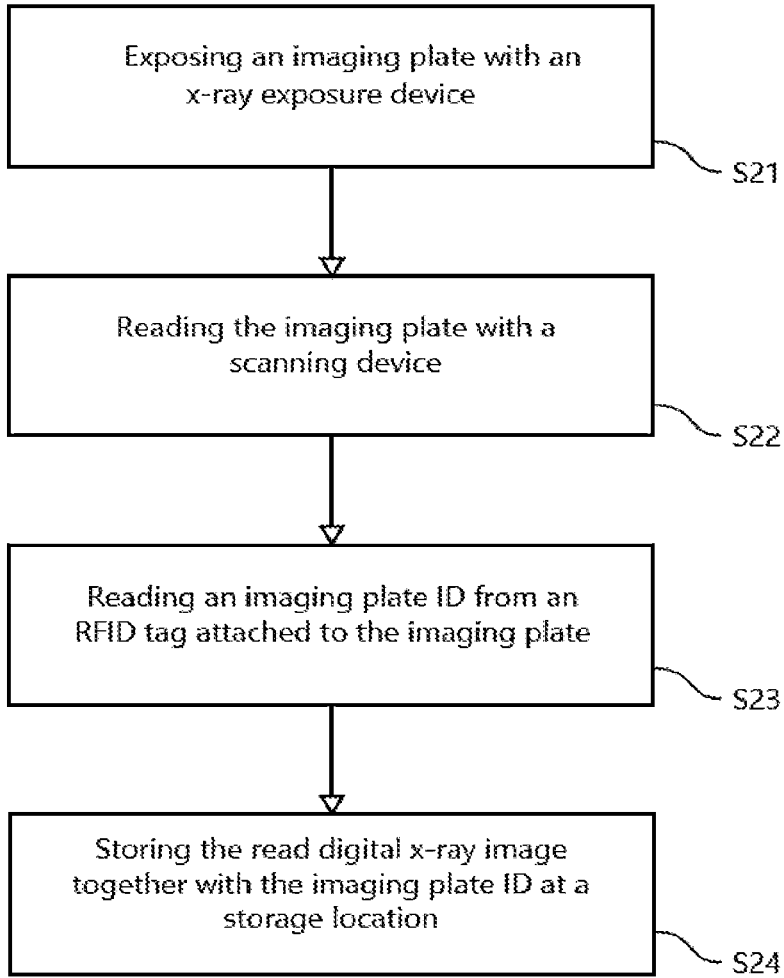
FIG. 2 shows the creating of suitable X-ray images.

FIG. 2 illustrates the process of creating the X-ray images needed for examining the storage functionality of an imaging plate.

In a first step (S21), an imaging plate is exposed by means of an X-ray exposure device. This is a common procedure that does not require further explanation.

In a further step (S22), the imaging plate is read out by means of a scanning device. This produces a digital X-ray image. In the readout process, as described in detail, the metastable states of the storage centers are excited by means of a readout light, and relaxation takes place with the emission of fluorescence light.

Simultaneously, before or after this, an RFID tag attached to the imaging plate is read (S23) to obtain an identifier that can be uniquely assigned to the imaging plate.

The digital X-ray image is then linked (S24) to the unique identifier of the imaging plate and stored at a storage location. The X-ray images can be stored already sorted by imaging plate. Alternatively, the X-ray images can already be presorted according to the respective acquisition date.

Figure 3:
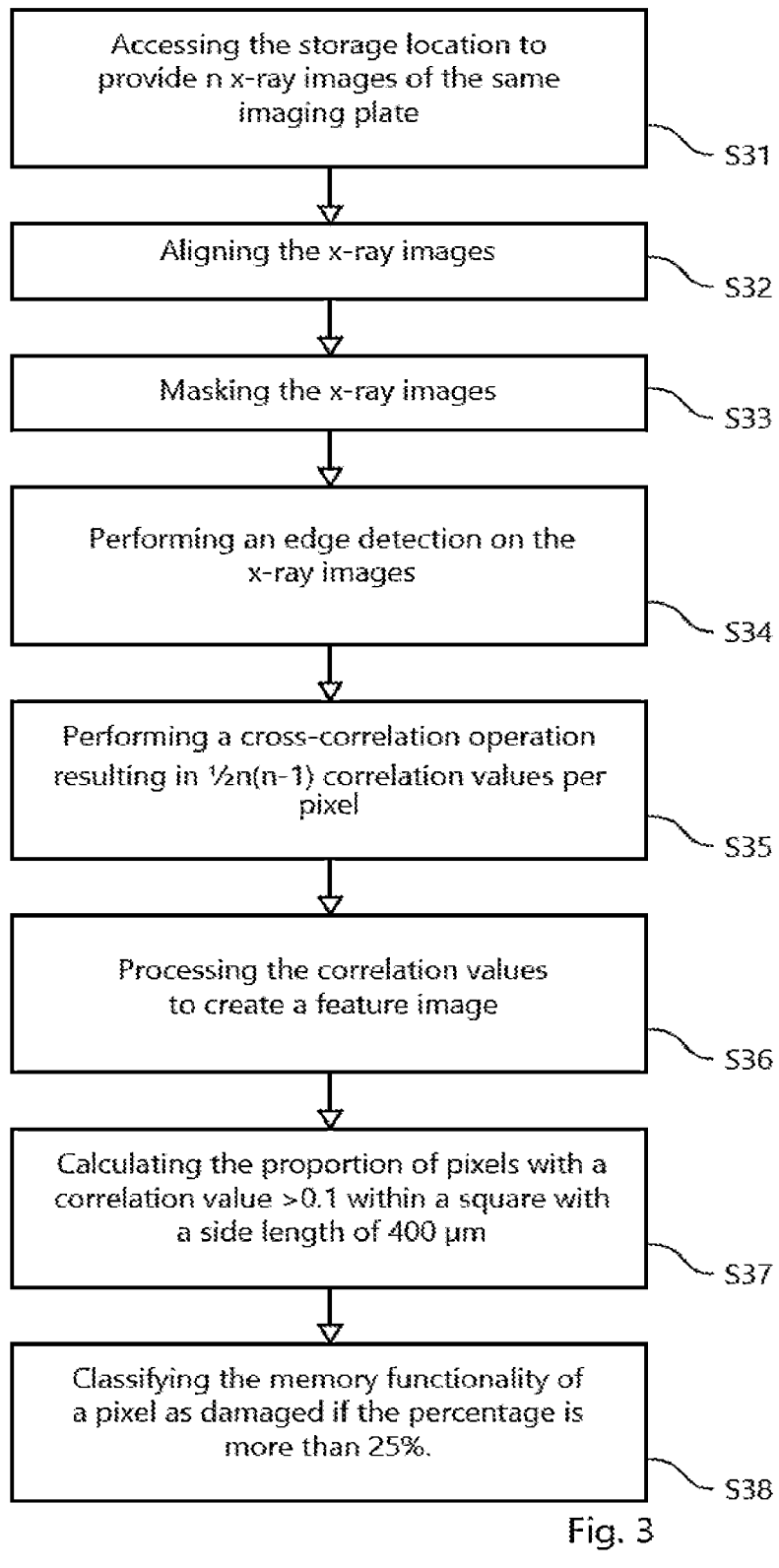
FIG. 3 shows a second embodiment.

FIG. 3 illustrates a second embodiment of the process according to the invention.

In a first step (S31), a storage location is accessed at which X-ray images are stored in order to provide n X-ray images of the same imaging plate. The X-ray images of the same imaging plate are selected on the basis of an identifier with which the X-ray images are associated. For example, the identifier that can be uniquely associated with the imaging plate may be embedded in the X-ray image file—for example, the metadata. The selection of n X-ray images typically includes a certain number—for example, 10, 20, or 30—of the most recent X-ray images taken with the same imaging plate.

In a further step (S32), the X-ray images are aligned. For this purpose, for example, alignment marks recognizable in the X-ray image can be used for an initial rough alignment and the edges of the X-ray plate recognizable in the X-ray image can be used for a fine alignment.

In order to better prepare the image content of the X-ray image for analysis, image content that cannot be used for analysis is masked in a further step (S33). This can be, for example, the aforementioned alignment marks, the edges of the imaging plate or other image content that is permanently linked to the imaging plate. Further analysis then takes place on relevant image contents excluding the masked image contents.

In a further step (S34), edge detection is performed on the masked X-ray images to improve the signal-to-noise ratio of the image contents.

On the X-ray images processed in this way, the cross-correlation operation is now performed (S35).

Figure 4:
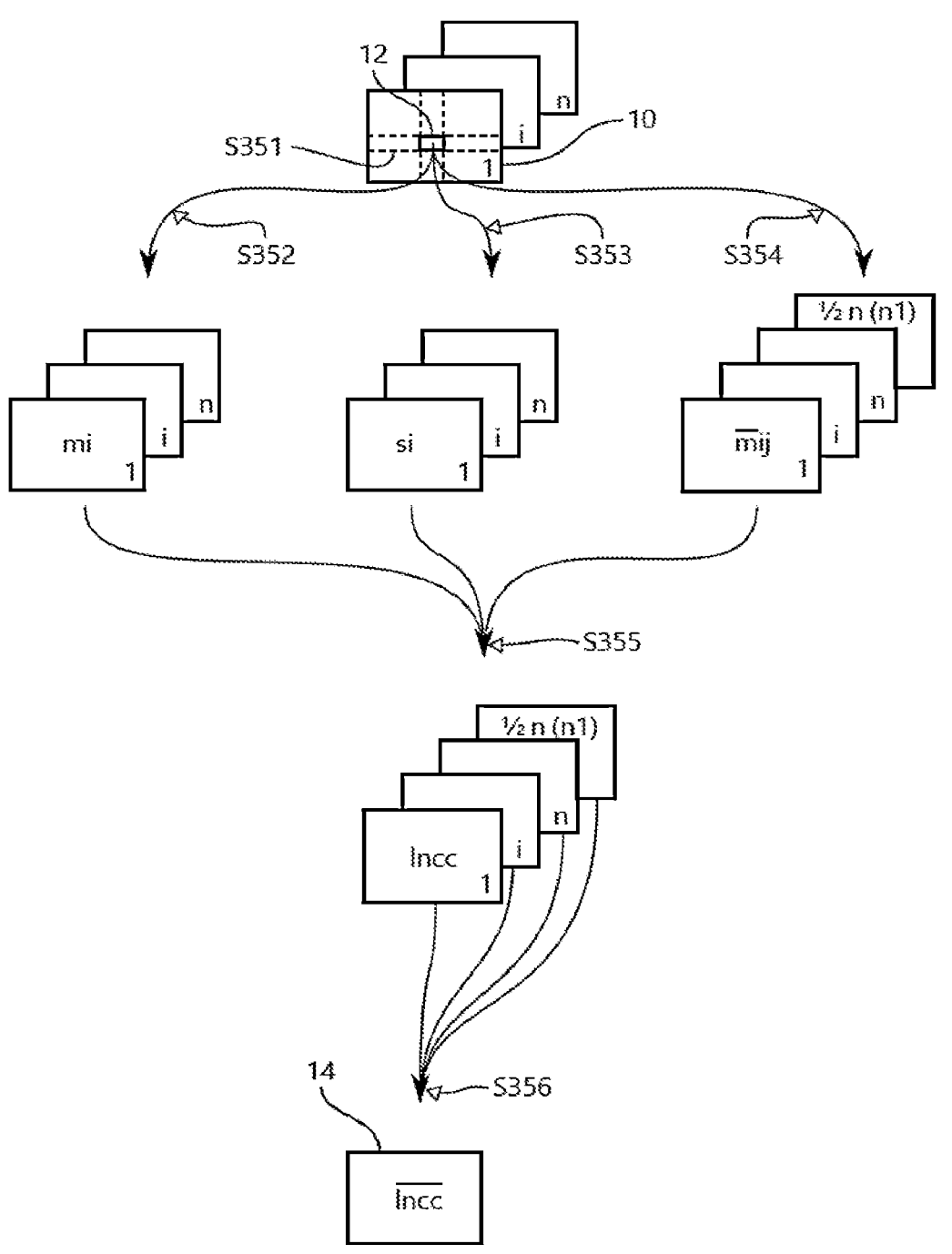
FIG. 4 shows an illustration of a first part of the second embodiment.

This is additionally shown in FIG. 4.

First, a mean value mi and a standard deviation si within a field 12 are calculated for each of the n X-ray images 10. The field 12, defined here as a correlation field 12, comprises a portion of the X-ray image 10 that is smaller than the X-ray image itself. Preferably, the size of the correlation field 12 is adapted to the ab-measurements of possible damage to the imaging plate. This should mean that the correlation field 12 must be small enough so that a possible damage can still be detected. At the same time, the correlation field 12 should be large enough to allow averaging over a certain number of image centers or pixels. For example, the dimensions for such a correlation field can be 100 µm×100 µm, for example 4×4 pixels.

The correlation field 12 is shifted pixel by pixel over the entire X-ray image (S351) and the mean value mi (S352) and the standard deviation si (S353) are calculated for each position of the correlation field 12. This calculation results in value matrices that have approximately the size of the original image. While in the center area of the image each pixel corresponds to a field position, at the edges of the image some pixel-field position correspondences are dropped due to the own size of the correlation field.

At the same time, for each position of the correlation field within the correlation field, a product $\overline{mij}$ between each pixel within the field and a pixel at the same position in another image is calculated and averaged over the correlation field (S354). This operation is performed for all possible image combinations. The resulting value matrices have the same size as those for mean and standard deviation. However, while the number of matrices for the means and standard deviations is equal to the number of images, the product formation yields ½ n (n−1) value matrices for all possible combinations.

Using the value matrices obtained in this way, the local normalized cross-correlation for each of the ½ n (n−1) combinations can be calculated (S355) and averaged over all these combinations (S3561. The cross-correlation is calculated as follows:

$$lncc = \frac{mij - mi \cdot mj}{si \cdot sj}$$

Here mi, mj are the mean value of image i and j, respectively, averaged over the correlation field, and si, sj are the associated standard deviations. mij is the product between images i and j averaged over the correlation field as described above.

The lncc values thus obtained for all possible image combinations are averaged, so that a single matrix of values 14 then remains with the calculated correlation values (S356). Alternatively, instead of arithmetic averaging, the median and, if necessary, additionally the standard deviation can be calculated.

This matrix of values 14 can be displayed as an image (S36). In this image, called feature image, features 16, 18 (see FIG. 5) are recognizable which persist over the different exposures made with the same imaging plate and are thus a feature of the imaging plate and not of the actual structures imaged on the X-ray images 10. The actual structures imaged, on the other hand, differ at least slightly from X-ray image to X-ray image.

Figure 5:
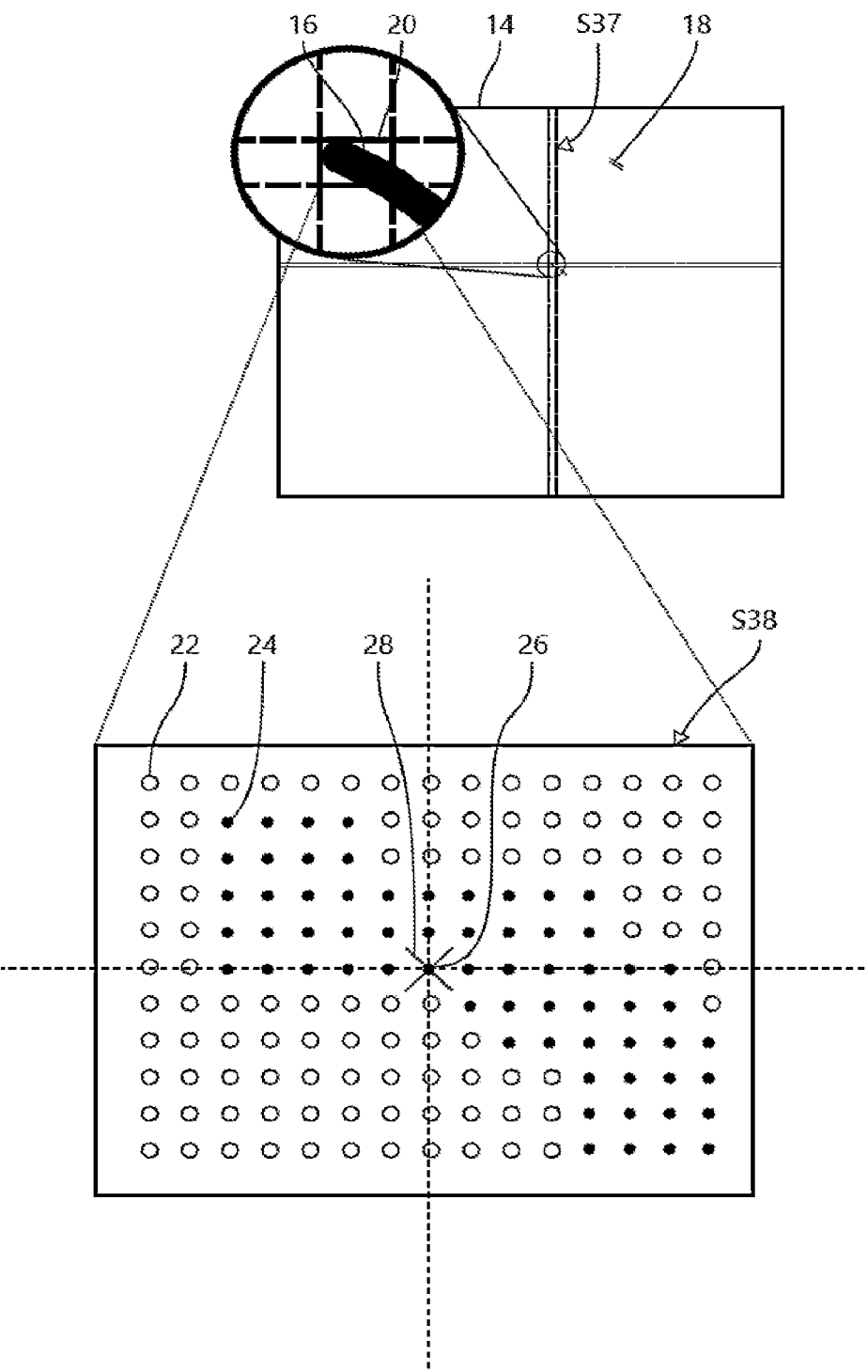
FIG. 5 shows an illustration of a second part of the second embodiment.

In order to characterize the storage capability of the imaging plate on the basis of the correlation values and to classify the storage capability as "non-existent" or as "defective" for certain areas, the pixels of the feature image are examined (S37). This is also illustrated in FIG. 5.

In the feature image 14, those pixels 24 are determined from all pixels 22 whose correlation value within a specified analysis field 20 is above a threshold. The threshold value preferably ranges between 0.07 and 0.15 and may be, for example, 0.1. Exemplarily, the analysis field 20 has a physical dimension of, for example, 400 µm×400 µm and, as mentioned above, can be adapted to the physical dimensions of the imaging plate and the type and size of the defects to be expected.

If, within the analysis field 20, the number of pixels 22 whose averaged correlation value is at or above this threshold is above a maximum number (S38), the image point 26 associated with the analysis field 20 is marked as no longer functional with respect to its storage capability 28. The analysis field 20 is used to scan the feature image 14 point by point so that, at the end, those pixels 28 whose functional capability is so impaired that they are to be marked as no longer functional are marked. As a maximum number of correlation values lying at or above the threshold, for example, a relative size such as 25% of all correlation values lying in the analysis field 20 can be selected.

The invention claimed is:

1. A method for determination of the storage functionality of an X-ray imaging plate, comprising the steps of:
   a) providing a plurality of digital X-ray images of the X-ray imaging plate;
   b) performing a cross-correlation operation on the digital X-ray images for relevant image regions to generate correlation values, wherein each of the plurality of digital X-ray images comprises a plurality of correlation fields, wherein the step of performing a cross-correlation operation comprises, for each of the plurality of correlation fields, calculating a mean value mi and a standard deviation si in each of the plurality of correlation fields of each of the plurality of digital X-ray images to generate value matrices that are approximately the size of each of the plurality of digital X-ray images;
   c) creating feature images from the correlation values; and
   d) classifying the storage functionality of the X-ray imaging plate, wherein the classifying corresponds to a pixel of a feature image based on the correlation values of other pixels in the vicinity of the pixel, wherein the pixel is classified as faulty if the number of other pixels in the vicinity have correlation values that exceed a correlation threshold.

2. The method according to claim 1, wherein in the step of classifying, only other pixels in the vicinity whose correlation value exceeds a correlation threshold are used.

3. The method according to claim 1, comprising the step of: performing the cross-correlation operation pairwise between a digital X-ray image and re-maining X-ray images of the plurality of digital X-ray images of the same imaging plate.

4. The method according to claim 1, further comprising the step of: performing an alignment detection or/and an edge detection on a digital X-ray image before performing the cross-correlation operation.

5. The method according to claim 1, wherein the digital X-ray images comprise usage data.

6. The method according to claim 1, wherein the cross-correlation operation is locally normalized.

7. The method according to claim 1, wherein the vicinity of the pixel is a square with a side length between 10 μm and 1000 μm.

8. The method according to claim 1, wherein the threshold is 25%.

9. The method according to claim 1, wherein the relevant image regions of the digital X-ray image exclude alignment marks or/and the edge of the imaging plate.

10. The method according to claim 1, wherein the acquisition date of the digital X-ray image is taken into account in the classification step.

11. The method according to claim 1, further comprising, for each position of each of the plurality of correlation fields, calculating a product mij between each pixel within the correlation field and a pixel at a same position in another X-ray image; and averaging the product mij over each of the plurality of correlation fields to generate value matrices.

12. The method according to claim 11, wherein the calculating and averaging steps are repeated for all combinations of the plurality of X-ray images.

13. The method according to claim 12, further comprising calculating a local normalized cross-correlation (lncc) for each of the combinations, wherein the lncc is calculated as follows:

$$lncc = mij - mi \cdot mj / si \cdot sj$$

wherein mi, mj are the mean value of image i and j, respectively, averaged over the correlation field of the plurality of correlation fields, and si, sj are the associated standard deviations.

14. A device for determining the storage capacity of an imaging plate for X-ray images according to the method of claim 1, the device comprising:
   an imaging plate readout apparatus for reading out an exposed imaging plate.

\* \* \* \* \*